United States Patent
Yadav et al.

(10) Patent No.: US 12,003,527 B2
(45) Date of Patent: Jun. 4, 2024

(54) AUTOMATICALLY DETECTING VULNERABILITY REGRESSIONS

(71) Applicant: Uber Technologies, Inc., San Francisco, CA (US)

(72) Inventors: Aastha Yadav, Seattle, WA (US); Martin Hristov Georgiev, Seattle, WA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 17/991,126

(22) Filed: Nov. 21, 2022

(65) Prior Publication Data

US 2023/0078033 A1    Mar. 16, 2023

Related U.S. Application Data

(63) Continuation of application No. 16/867,153, filed on May 5, 2020, now Pat. No. 11,509,677.

(51) Int. Cl.
*H04L 9/40* (2022.01)

(52) U.S. Cl.
CPC .............................. *H04L 63/1433* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 7,694,337 B2* | 4/2010 | D'Mello | ............... | G06F 21/577 717/170 |
| 9,117,069 B2* | 8/2015 | Oliphant | ............. | H04L 63/1433 |
| 9,270,695 B2* | 2/2016 | Roytman | ............ | H04L 63/1433 |
| 10,341,377 B1 | 7/2019 | Dell'Amico et al. | | |
| 11,113,759 B1 | 9/2021 | Kapczynski et al. | | |
| 11,509,677 B2* | 11/2022 | Yadav | ................. | H04L 63/1433 |

(Continued)

FOREIGN PATENT DOCUMENTS

| | | |
|---|---|---|
| CN | 104363236 A | 2/2015 |
| CN | 110311886 A | 10/2019 |

(Continued)

OTHER PUBLICATIONS

United States Office Action, U.S. Appl. No. 16/867,153, Apr. 5, 2022, 15 pages.

(Continued)

*Primary Examiner* — Sarah Su (74) *Attorney, Agent, or Firm* — Fenwick & West LLP (57) ABSTRACT

A method or system for automatically detecting vulnerabilities. The system obtains an identifier associated with a vulnerability and one or more vulnerability detection parameters associated with the vulnerability. The system also obtains a script based in part on the one or more vulnerability detection parameters. The system then periodically executes the script to determine whether the vulnerability has been remediated or reintroduced. Responsive to determining that the vulnerability has been remediated, the system transmits a request to a vulnerability tracking system to resolve a security alert. Responsive to determining that the vulnerability has been reintroduced, the system transmits a request to the vulnerability tracking system to reactivate the security alert.

20 Claims, 6 Drawing Sheets

(56) References Cited

U.S. PATENT DOCUMENTS

| | | |
|---|---|---|
| 2007/0006314 A1 | 1/2007 | Costa et al. |
| 2007/0011319 A1* | 1/2007 | McClure ................ H04L 41/12 709/224 |
| 2007/0067846 A1* | 3/2007 | McFarlane ............ G06F 21/577 726/25 |
| 2012/0079598 A1 | 3/2012 | Brock et al. |
| 2014/0165204 A1 | 6/2014 | Williams et al. |
| 2015/0040232 A1* | 2/2015 | Oliphant ............ H04L 63/0281 726/25 |
| 2016/0127417 A1* | 5/2016 | Janssen ............... H04L 63/1433 726/1 |
| 2017/0070415 A1 | 3/2017 | Bell et al. |
| 2017/0098087 A1* | 4/2017 | Li ....................... H04L 63/1416 |
| 2017/0251010 A1* | 8/2017 | Irimie ................. H04L 63/1433 |
| 2018/0260558 A1 | 9/2018 | Li et al. |
| 2018/0307849 A1* | 10/2018 | Tseitlin ................ H04L 63/101 |
| 2019/0166149 A1 | 5/2019 | Gerrick |
| 2019/0182294 A1 | 6/2019 | Rieke et al. |
| 2019/0188392 A1* | 6/2019 | El-Moussa ............ G06F 21/577 |
| 2019/0289029 A1 | 9/2019 | Chawla et al. |
| 2019/0370575 A1 | 12/2019 | Nandakumar et al. |
| 2019/0377880 A1 | 12/2019 | Kolychev et al. |
| 2020/0084632 A1* | 3/2020 | Skvortsov ........... H04L 63/0876 |
| 2020/0106793 A1 | 4/2020 | Vanamali |
| 2020/0382529 A1* | 12/2020 | Higgins .............. H04L 41/0631 |
| 2020/0412766 A1 | 12/2020 | Gu et al. |
| 2021/0014256 A1* | 1/2021 | Malhotra ............ H04L 63/1425 |
| 2021/0037038 A1 | 2/2021 | Alsharif et al. |
| 2021/0110047 A1 | 4/2021 | Fang |
| 2023/0120174 A1* | 4/2023 | Seck ................... H04L 63/1441 726/25 |

FOREIGN PATENT DOCUMENTS

| | | | | |
|---|---|---|---|---|
| CN | 110460612 A | * | 11/2019 | ......... H04L 63/1408 |
| CN | 112714125 A | | 4/2021 | |
| CN | 112738094 A | * | 4/2021 | ......... H04L 63/1416 |
| CN | 114756870 A | * | 7/2022 | |
| CN | 115618353 A | * | 1/2023 | |
| EP | 1580959 A1 | | 9/2005 | |
| EP | 2942750 A1 | * | 11/2015 | .......... G06F 16/955 |
| EP | 2999188 A1 | * | 3/2016 | .......... G06F 21/552 |
| WO | WO 2004/056069 A2 | | 7/2004 | |

OTHER PUBLICATIONS

United States Office Action, U.S. Appl. No. 16/867,153, Nov. 1, 2021, 17 pages.

* cited by examiner

AUTOMATICALLY DETECTING VULNERABILITY REGRESSIONS

CROSS REFERENCE TO RELATED APPLICATIONS

This application is a continuation of a co-pending U.S. application Ser. No. 16/867,153, filed on May 5, 2020, which is incorporated herein by reference in its entirety.

TECHNICAL FIELD

This disclosure generally relates to vulnerability elimination, and more particularly to preventing regressions of vulnerabilities in changing computer environments.

BACKGROUND

Vulnerability testing and elimination is an important aspect of cyber security. Currently, systems enable detecting vulnerabilities and alerting engineers and others of an existence of detected vulnerabilities. When vulnerabilities are detected, those vulnerabilities are generally eliminated by engineers that develop program updates or settings updates. When an engineer updates the environment, with new code or settings, the alert is closed. However, when a computer environment is updated (e.g., to a new version of code), the current systems do not scan the environment for vulnerability regressions.

SUMMARY

Therefore, examples herein describe a mechanism for automatically detecting that a previously eliminated vulnerability has reappeared as a result of a change in an environment. In various embodiments, a system receives data indicating that an active vulnerability alert (e.g., an open ticket in a ticketing system) exists for a specific vulnerability. The system is enabled to retrieve vulnerability parameters from the alert and generate (or retrieve) a script for detecting the vulnerability based on those parameters. The script is then executed to determine whether the vulnerability has been eliminated. Responsive to the script determining that the vulnerability has been eliminated, the system transmits a request to deactivate the vulnerability alert (e.g., close the ticket). The script is then continually or periodically executed (e.g., at an interval or at a specified time(s)). If the system, through executing the script, determines that the vulnerability has been reintroduced into the environment (e.g., via a code upgrade or a parameter update), the system reopens the existing alert indicating that the vulnerability has been reintroduced into the environment.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates a system that automatically detects that a previously eliminated vulnerability has reappeared, in accordance with some embodiments of this disclosure.

DETAILED DESCRIPTION

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
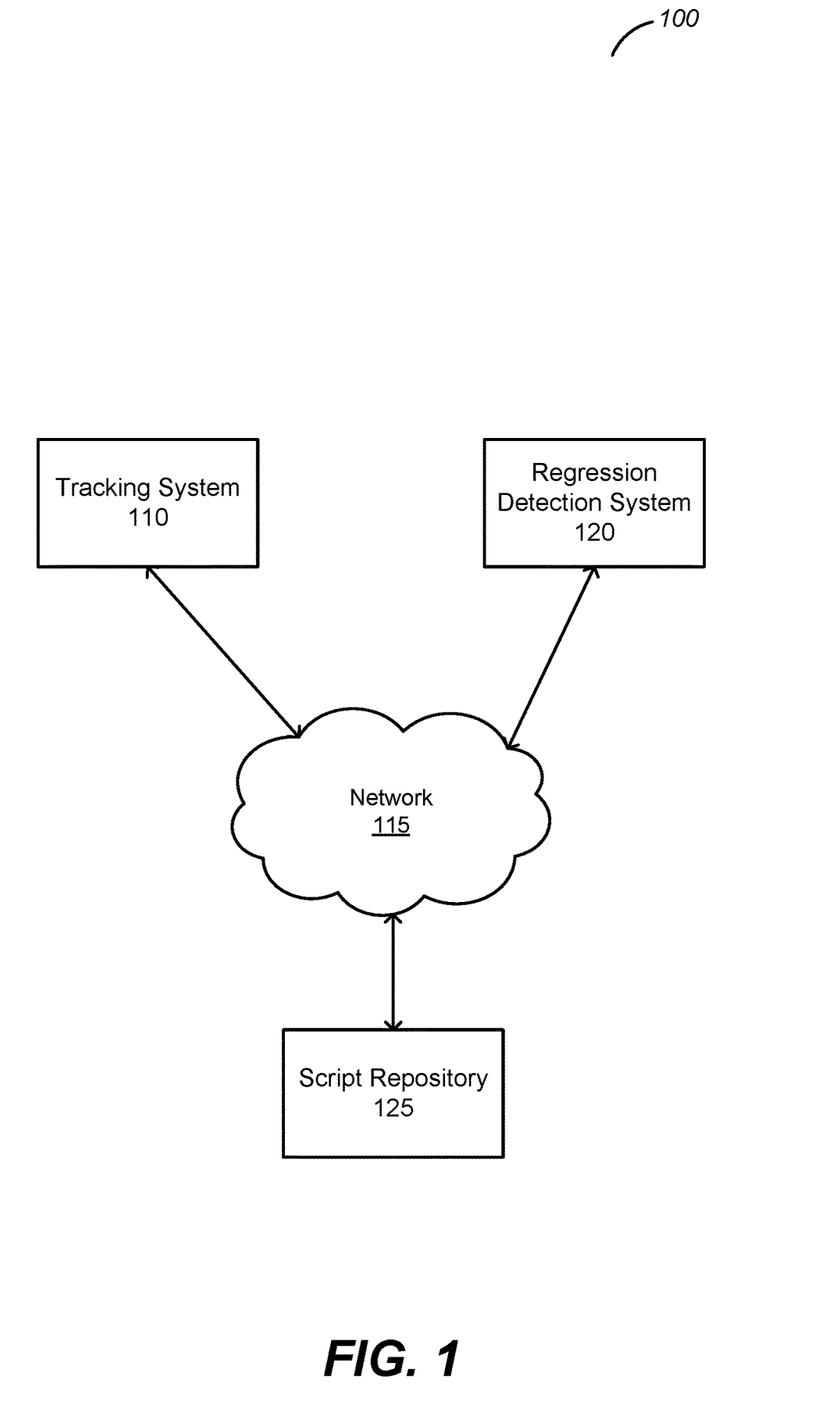

FIG. 1 illustrates a system 100 that automatically detects that a previously eliminated vulnerability has reappeared. Although this disclosure discusses tracking vulnerabilities, the same system may be used to track software defects in a similar manner. System 100 includes tracking system 110, regression detection system 120, and script repository 125 that may be connected by a network 115. Although FIG. 1 shows that tracking system 110, regression detection system 120, and script repository 125 being connected via a network, in some embodiments, those systems may reside on the same device (e.g., a server). Other configurations of these systems may also be deployed. For example, regression detection system 120 and script repository 125 may be placed on the same device (e.g., a server) while tracking system 110 may be placed on a separate device.

Tracking system 110 may be a ticketing system residing on a server device. When vulnerability is discovered, a ticket or an alert may be activated (e.g., opened) in the tracking system 110. Tracking system 110 may reside on a computing device (e.g., as discussed with reference to FIG. 3). The computing device may be a server, a workstation, or another suitable computing device. The tracking system may include software (e.g., for opening and tracking tickets or alerts) and/or hardware components (e.g., as described in connection with FIG. 3).

Script repository 125 may be used to store scripts and/or script templates. Script repository 125 may include a database for storing scripts and templates. In some embodiments, the scripts and templates may be stored with corresponding metadata. For example, a script may have metadata indicating the run interval of the script, the associated alert and other suitable metadata. Each template may include metadata on the type of vulnerability that the template corresponds to as well as any parameters that may be used to turn the template into a functioning script. Script repository 125 may reside on a computing device (e.g., as discussed with reference to FIG. 3). The computing device may be a server, a workstation, or another suitable computing device. The script repository may include software (e.g., for storing, adding, and/or removing scripts and templates) and/or hardware components (e.g., as described in connection with FIG. 3).

Regression detection system 120 may detect regressions by executing scripts. Regression detection system 120 may also include a mechanism to schedule script execution and to perform other functions. For example, the regression detection system may reactivate vulnerability alerts, deactivate vulnerability alerts and perform other actions as described in relation to FIG. 4. Regression detection system 120 may reside on a computing device (e.g., as discussed with reference to FIG. 3). The computing device may be a server, a workstation, or another suitable computing device. The script repository may include software (e.g., for executing and scheduling scripts) and/or hardware components (e.g., as described in connection with FIG. 3).

Network 115 may be any network that enables devices to connect to each other. For example, network 115 may be the Internet, a local network, or a combination of the two. Network 115 may support various protocols to connect devices. For example, network 115 may support an Internet Protocol (IP) that enables connections between devices using IP addresses. The IP protocol is generally used in combination with a Transmission Control Protocol (TCP) which is a set of protocols enabling devices to connect to each other. Together TCP and IP are often referred to as TCP/IP.

Figure 2:
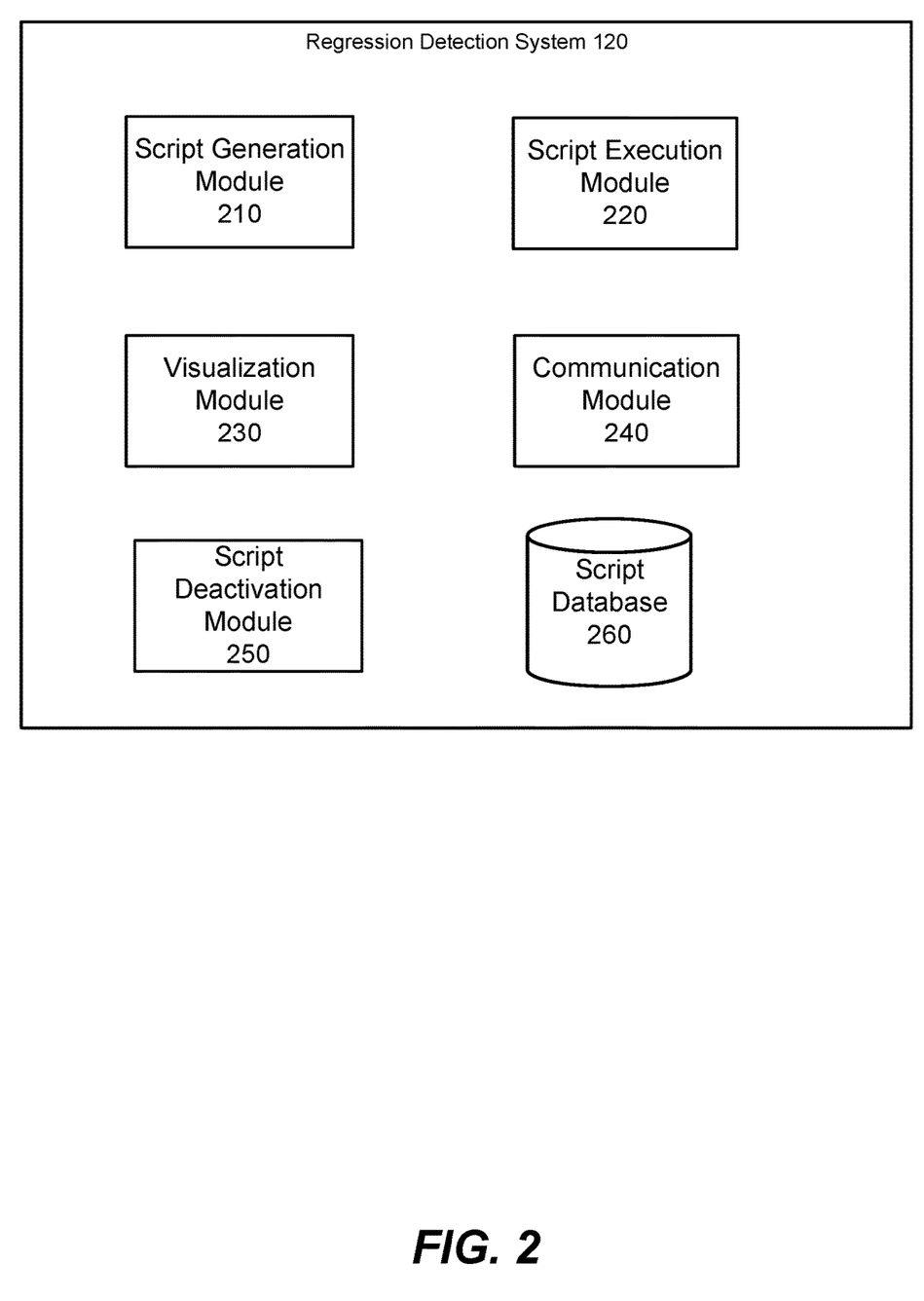
FIG. 2 illustrates one embodiment of exemplary modules for automatically detecting that a previously eliminated vulnerability has reappeared, in accordance with some embodiments of this disclosure.

The systems of FIG. 1 may host one or more modules of regression detection system 120 illustrated in FIG. 2. Regression detection system 200 may include a script generation module 210, a script execution module 220, a visualization module 230, a communication module 240, a script deactivation module 250, and a database 260. The modules depicted in FIG. 2 are merely exemplary; fewer or more modules may be included to execute the functions described with respect to the regression detection system 120.

Script generation module 210 receives vulnerability alerts and determines which scripts may be used to detect the associated vulnerabilities. For example, the script generation module may receive a vulnerability alert for one or more electronic systems. In some embodiments, the script generation module may receive a vulnerability alert in a form of a ticket from a ticketing system (e.g., tracking system 110). The ticket may have been opened by a security engineer when a vulnerability was discovered. Furthermore, the vulnerability alert may be a code defect alert (e.g., for a bug) which could have been opened in the ticketing system by a quality assurance engineer. Thus, the vulnerability alert may be transmitted by the tracking system 110 and received by the regression detection system 120 that is hosting the script generation module 210.

The vulnerability alert may include one or more vulnerability detection parameters. For example, the vulnerability detection parameters may include an identifier of the vulnerability, an identifier of the vulnerability alert, a script type, script code, and/or other suitable parameters. The identifier of the vulnerability may be a set of characters, a number, a string, a hexadecimal number, or another suitable identifier. The identifier of the vulnerability may indicate a type and instance of the vulnerability. For example, the vulnerability identifier may have associated data (e.g., stored in a database). Other parameters may include a device identifier of the effected device, a network address of the device, a port number and/or any other suitable parameters.

The script generation module 210 may determine, using the vulnerability detection parameters, a script for detecting a vulnerability associated with the vulnerability alert. For example, a script database 260 may include a multitude of script templates that the script generation module 210 may use. The script generation module 210 may retrieve the vulnerability detection parameters and determine a type of vulnerability (e.g., a webpage exploit) based on the vulnerability parameters. The script generation module 210 may query script database 260 for any templates associated with that type of vulnerability. The script database 260 may return one or more templates for the type of vulnerability. The script generation module 210 may select the best template (or if only one template is returned that template) to generating the script. Thus, the script generation module may select a script template based on the type of vulnerability.

The script generation module 210, may determine, using the vulnerability detection parameters and/or the template, a script for detecting a vulnerability associated with the vulnerability alert. For example, if the vulnerability parameters include a server name, path, and other suitable parameters, the script generation module may add those parameters as variables to the script. As a result, the script generation module 210 generates a script that is ready for execution.

The script generation module may schedule the script to be repeatedly executed at an interval (e.g., every two hours, twenty-four hours, or another suitable interval). In some embodiments, the script generation module 210 may determine the interval based on a severity level associated with the vulnerability. For example, the script generation module 210 may determine a severity level associated with the vulnerability alert based on various factors. For example, the script generation module 210 may retrieve the severity level from the vulnerability alert (e.g., the severity level may be one of the vulnerability parameters). In another example, the script generation module 210 may determine the vulnerability level using a table (e.g., stored in the script database 260). The table may include an alert type and a corresponding vulnerability level. The script generation module 210 may generate a schedule for execution of the script for detecting the vulnerability based on the severity level. For example, a script associated with a high severity level may be executed every hour or every few hours. A script associated with a medium severity level may be executed every twelve or twenty-four hours, and a script associated with a low severity level may be executed every two days, three days, every week or another suitable interval.

When a script for detecting a vulnerability is generated and scheduled, the script execution module 220 executes that script. Based on the output of the script, the script execution module 220 determines whether the vulnerability still exists or whether it no longer exists (e.g., the vulnerability has been fixed by the engineer). Responsive to determining that the vulnerability no longer exists, the script execution system may generate a request to deactivate the vulnerability alert in an alert tracking system (e.g., tracking system 110). The generated request may include an identifier of the vulnerability alert. The execution module 220 may relay the request to the communication module 240.

The communication module 240 may transmit, to a vulnerability tracking system (e.g., tracking system 110), the request to deactivate the vulnerability alert. The transmission may include an identifier of the vulnerability alert. When the vulnerability tracking system (e.g., tracking system 110) receives the request, the vulnerability tracking system may identify the vulnerability alert based on the identifier of the vulnerability alert, and deactivate the alert. For example, the vulnerability system may include a database of active vulnerability alerts with a corresponding identifier. The vulnerability tracking system (e.g., tracking system 110) may query the database for the identified vulnerability alert and mark the alert as deactivated (e.g., closed) in the database.

Script execution module 220 may, subsequently to determining that the vulnerability no longer exists, continue executing the script for detecting the vulnerability during the scheduled times (e.g., every 24 hours). If the output of the script keeps indicating that the vulnerability does not exist, the script execution module 220 may take no further action. However, if the output of the script indicates that the vulnerability exists, the script execution module 220 may determine that the vulnerability has been reintroduced. For example, the output of the script may be a Boolean value. If the Boolean indicates "True", the vulnerability has been reintroduced, and if the Boolean indicates "False", the vulnerability has not been reintroduced.

Responsive to determining that the vulnerability has been reintroduced, the script execution module 220 may generate a request to reactivate the vulnerability alert. The request may include identifier of the alert to be reactivated. The script execution module 220 may relay the request to a communication module (e.g., communication module 240). The communication module (e.g., communication module 240) may transmit the request to the vulnerability tracking system (e.g., tracking system 110). The vulnerability tracking system (e.g., tracking system 110) may receive the request and, retrieve the identifier of the alert. The vulnerability tracking system (e.g., tracking system 110) may use the identifier of the alert to reactivate the alert.

Regression detection system 120 may also include a visualization module 230. The visualization module 230 may generate for display data about active vulnerability alerts with additional information. For example, the visualization module 230 may generate for display information indicating when a vulnerability alert was activated, deactivated, and reactivated. This information may enable an administrator to determine a time period of when a reactivation occurred, thereby enabling the administrator to pinpoint an environment change the caused the reactivation.

The regression detection system 120 may also include a script deactivation module 250. The script deactivation module 250 deactivates scheduled scripts. For example, when various software, servers, or other components are deactivated and taken out of the environment, executing scripts for detection vulnerability alerts from those components would generate many errors (e.g. because systems do not respond) and waste resources. Therefore, the script deactivation module 250 may deactivate scripts as appropriate. For example, the script deactivation module 250 may (e.g., based on administrator input) remove execution schedules for unneeded scripts and/or delete those scripts.

Computing Machine Architecture

Figure 3:
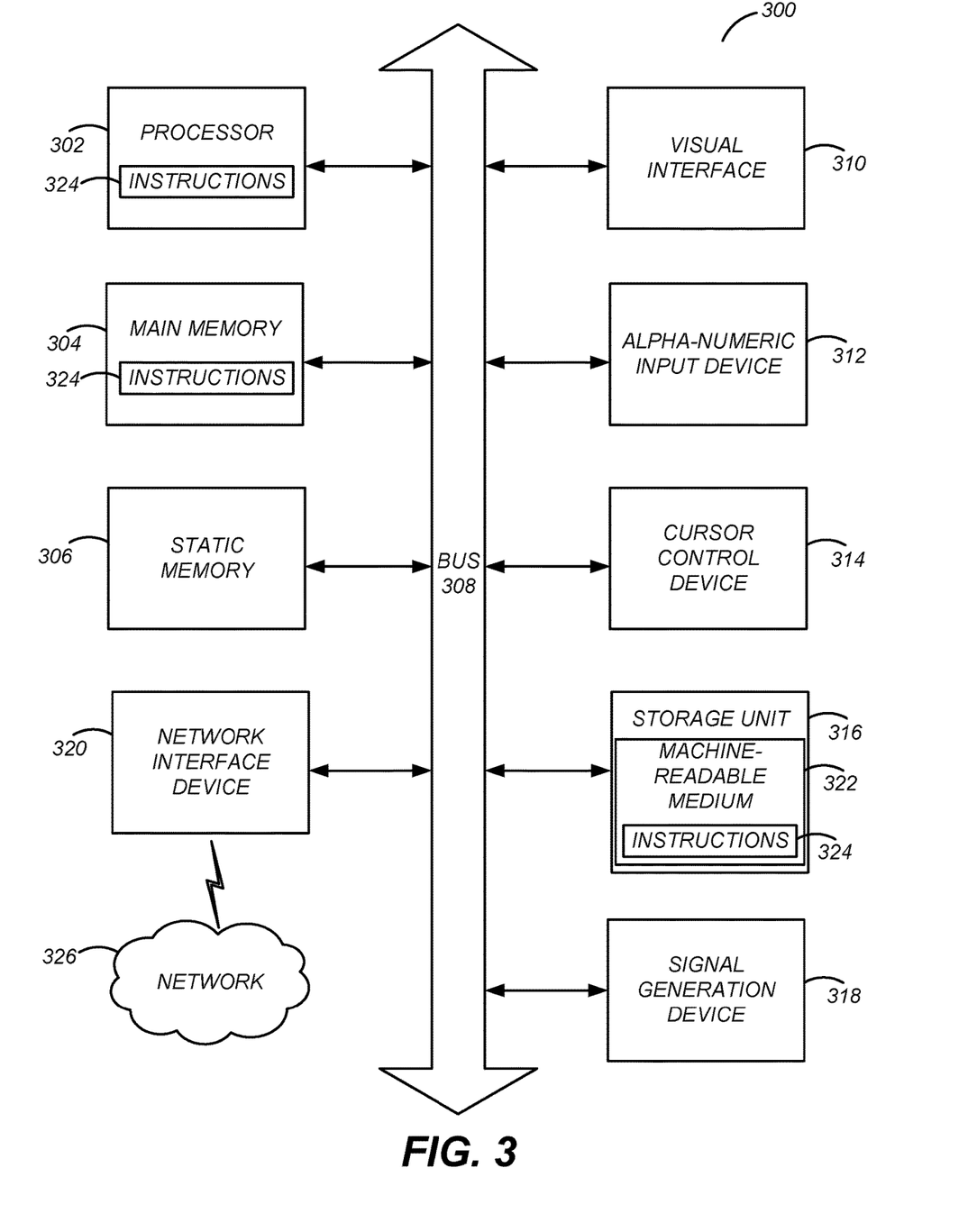
FIG. 3 is a block diagram illustrating components of an example machine able to read instructions from a machine-readable medium and execute them in a processor (or controller), in accordance with some embodiments of this disclosure.

FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alphanumeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

The computer system 300 may execute (e.g., using hardware such as a processor(s), memory, and other suitable hardware) instructions associated with the modules and components described in FIG. 2 (e.g., script generation module 210, script execution module 220, visualization module 230, communication module 240, script deactivation module 250, and script database 260).

Figure 4:
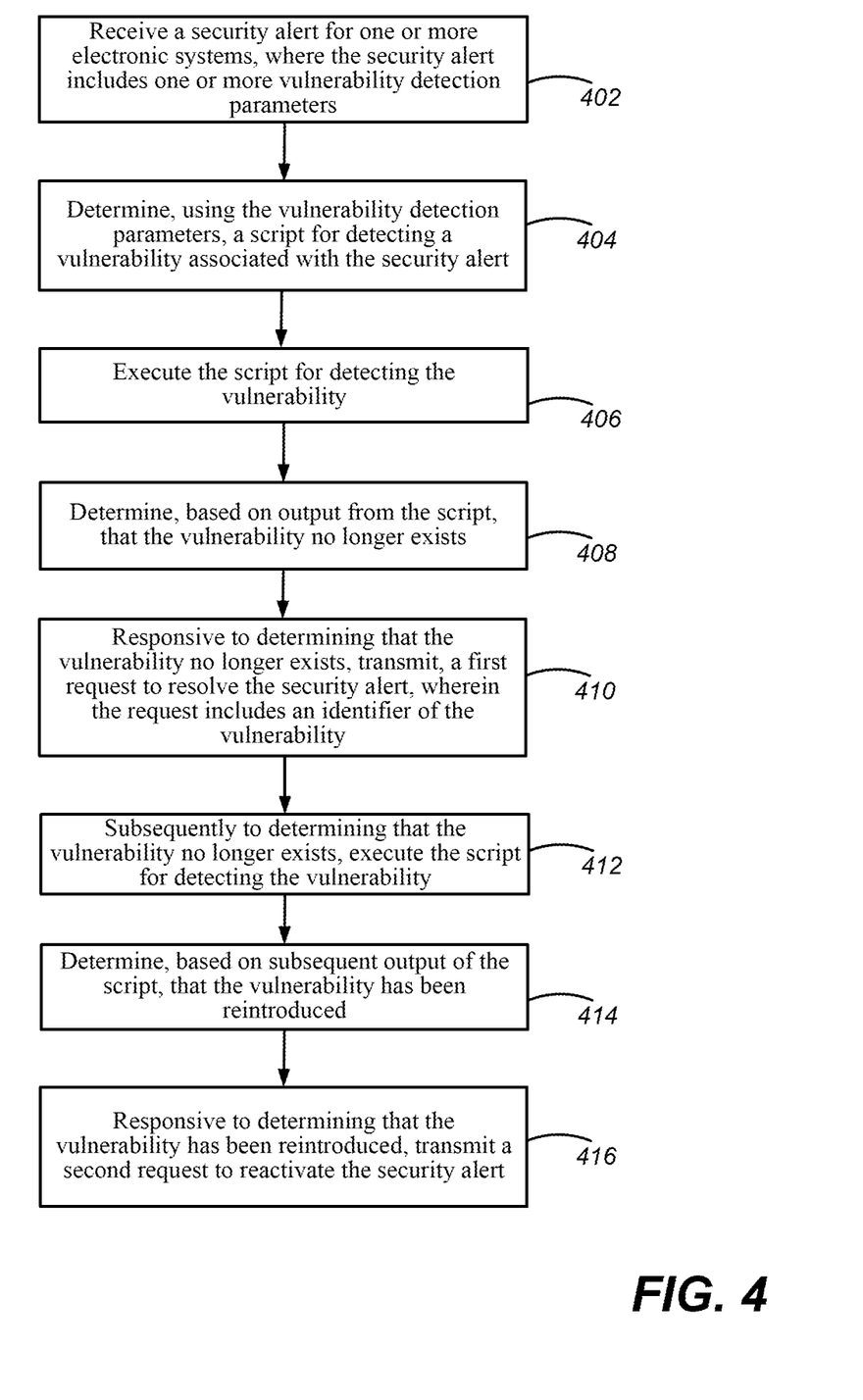
FIG. 4 illustrates one embodiment of an exemplary flow chart for automatically detecting that a previously eliminated vulnerability has reappeared, in accordance with some embodiments of this disclosure.

FIG. 4 illustrates actions for automatically detecting that a previously eliminated vulnerability has reappeared. At 402, a regression detection system 120 receives a vulnerability alert for one or more electronic systems. The vulnerability alert may include one or more vulnerability detection parameters. The regression detection system 120 may include hardware components illustrated in FIG. 3. For example, the regression detection system 120 may receive the vulnerability alert from a network 326 through network interface 320 and store the received vulnerability alert in memory (e.g., main memory 304). In some embodiments, network 326 may be the same as network 115. The vulnerability alert may be stored as a data structure with various detection parameters being stored as fields in the data structure. In some embodiments, the parameters may include a query and a type. For example, a query may be a query that can be inserted into a script to detect the vulnerability and the type may be associated with a specific template that the query may be inserted into.

Figure 5:
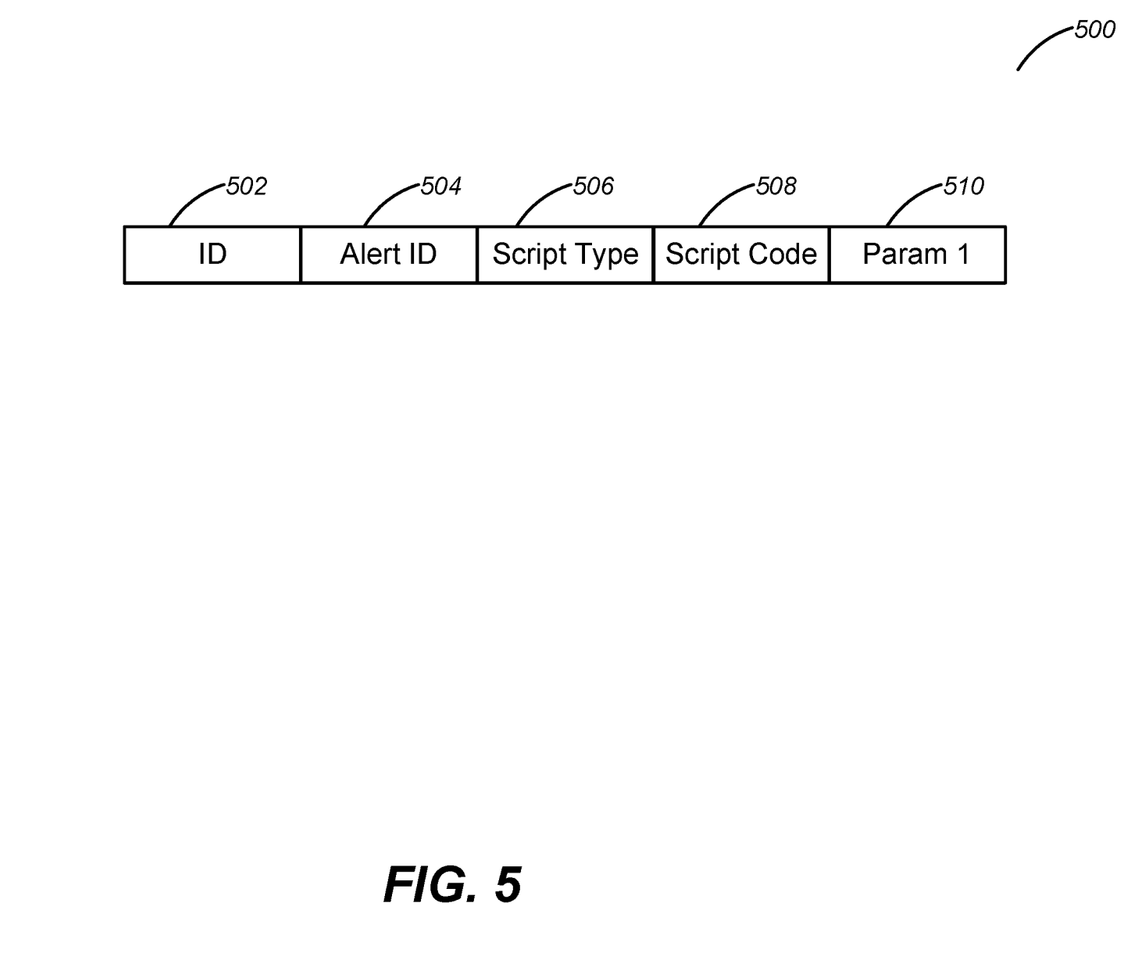
FIG. 5 illustrates an exemplary data structure for storing vulnerability parameters, in accordance with some embodiments of this disclosure.

FIG. 5 illustrates an exemplary data structure for storing vulnerability parameters. One or more parameters shown in data structure may be included in the set of vulnerability parameters. Field 502 may store an identifier for the vulnerability. As discussed above, the identifier may be a string, a number, a hexadecimal number, or another suitable identifier. Field 504 stores an alert identifier. As discussed above the alert identifier may be a string, a number, a hexadecimal number, or another suitable alert identifier. The alert identifier 504 may be generated by the tracking system 110, while the identifier 502 may be generated by a different system and added to the alert (e.g., by an engineer). Field 506 may store a script type that corresponds to a template script in script repository 125. Script types may be included in a table with identifiers of corresponding script templates from the script repository 125. Field 508 may store script code (e.g., a query) that may be inserted into a script template. One or more fields 510 may be added to data structure 500 for storing various other parameters.

The vulnerability alert may include an identifier of the vulnerability in the one or more vulnerability parameters. The identifier may be a string, a number, a hexadecimal number, or another suitable identifier. In some embodiments, the identifier may identify the vulnerability. For example, when the vulnerability is created (e.g., prior to generation of the vulnerability alert), the vulnerability may be assigned an identifier. The identifier may be included with any information later or earlier sent regarding the vulnerability. For example, when the regression detection system 120 transmits a request to the vulnerability tracking system (e.g., tracking system 110), the regression detection system 120 may include the identifier with the request. The vulnerability tracking system (e.g., tracking system 110) may use the identifier to reactivate the alert (e.g., reopen the ticket that was closed). For example, the tracking system 110 may query a database and use the identifier as a key to find the database entry for the vulnerability. The query may include a command to activate the vulnerability.

In some embodiments, the vulnerability alert received from the vulnerability tracking system (e.g., tracking system 110) includes the identifier of the vulnerability alert. For example, when the vulnerability is discovered, a vulnerability alert may be created by the vulnerability tracking system. During alert creation, the vulnerability tracking system (e.g., tracking system 110) may assign an identifier to the vulnerability alert. The identifier may be a string, a number, a hexadecimal number, or another suitable identifier. Thus, when the regression detection system 120 transmits a request to reactivate an alert the request may include the identifier of the vulnerability alert to reactivate.

Referring back to FIG. 4, at 404, the regression detection system 120 determines, using the vulnerability detection parameters, a script for detecting a vulnerability associated with the vulnerability alert. For example, the regression detection system may use one or more vulnerability detection parameters to generate a query for retrieving a script (e.g., from script repository 125). The query may include a type of a script received from the tracking system 110. The regression detection system may transmit the query to the script repository and receive in response a script template corresponding to the type. The regression detection system 120 may insert a query received from the tracking system 110 into the template to generate the script.

The regression detection system 120 may schedule the script to be executed at specific time intervals (e.g., every three hours, every six hours, every twenty-four hours, every three days, or at another suitable interval). In some embodiments, the time interval may be determined based on a severity level associated with the vulnerability. The regression detection system 120 may receive the severity level together with the vulnerability alert. For example, the severity level may be one of the detection parameters. In some embodiments, the regression detection system 120 may determine a severity level based on a type of vulnerability. The regression detection system may store a listing of types of vulnerabilities and corresponding severity levels.

At 406, the regression detection system 120 executes the script for detecting the vulnerability. The regression detection system 120 may execute the script based on detecting that a specific amount of time has elapsed from the last execution of the script (e.g., if a script is set to execute every three hours and three hours have elapsed). In some embodiments, the regression detection system 120 may execute a script based on a received command (e.g., from an administrator or an engineer).

At 408, the regression detection system determines, based on output from the script, that the vulnerability no longer exists. For example, when the regression detection system 120 executes the script, the script may return an output. The output may be in various forms indicating whether the vulnerability exists. For example, the output may be a Boolean value. When the Boolean indicates "True", the vulnerability exists and when the Boolean indicates "False" the vulnerability does not exist.

At 410, the regression detection system 120, responsive to determining that the vulnerability no longer exists, transmits, a first request to deactivate the vulnerability alert. The request may include an identifier of the vulnerability. For example, if the script returns a Boolean value of "False" indicating that the vulnerability no longer exists, the regression detection system 120 may transmit a request to the vulnerability tracking system (e.g., tracking system 110) a request to deactivate the vulnerability alert. For example, the regression detection system 120 may be hosted on a server that includes a network interface device 320 as discussed with respect to FIG. 3. The regression detection system 120 may use the network interface device 320 to transmit the request to the vulnerability tracking system (e.g., tracking system 110).

At 412, the regression detection system 120, subsequently to determining that the vulnerability no longer exists, executes the script for detecting the vulnerability. As discussed above, the regression detection system 120 may execute the script every three hours, six hours, twenty-four hours, or use another suitable interval. At 414, the regression detection system 120 determines, based on subsequent output of the script, that the vulnerability has been reintroduced. For example, the script may return the Boolean value of "True" when the script is executed.

At 416, the regression detection system 120, responsive to determining that the vulnerability has been reintroduced, transmits a second request to reactivate the vulnerability alert. For example, the regression detection system may use a network interface device 320 of FIG. 3 to transmit the request to a vulnerability tracking system (e.g., tracking system 110). The vulnerability tracking system may receive the request and reactivate the vulnerability alert based on the data within the request (e.g., using a vulnerability identifier and/or an alert identifier).

Figure 6:
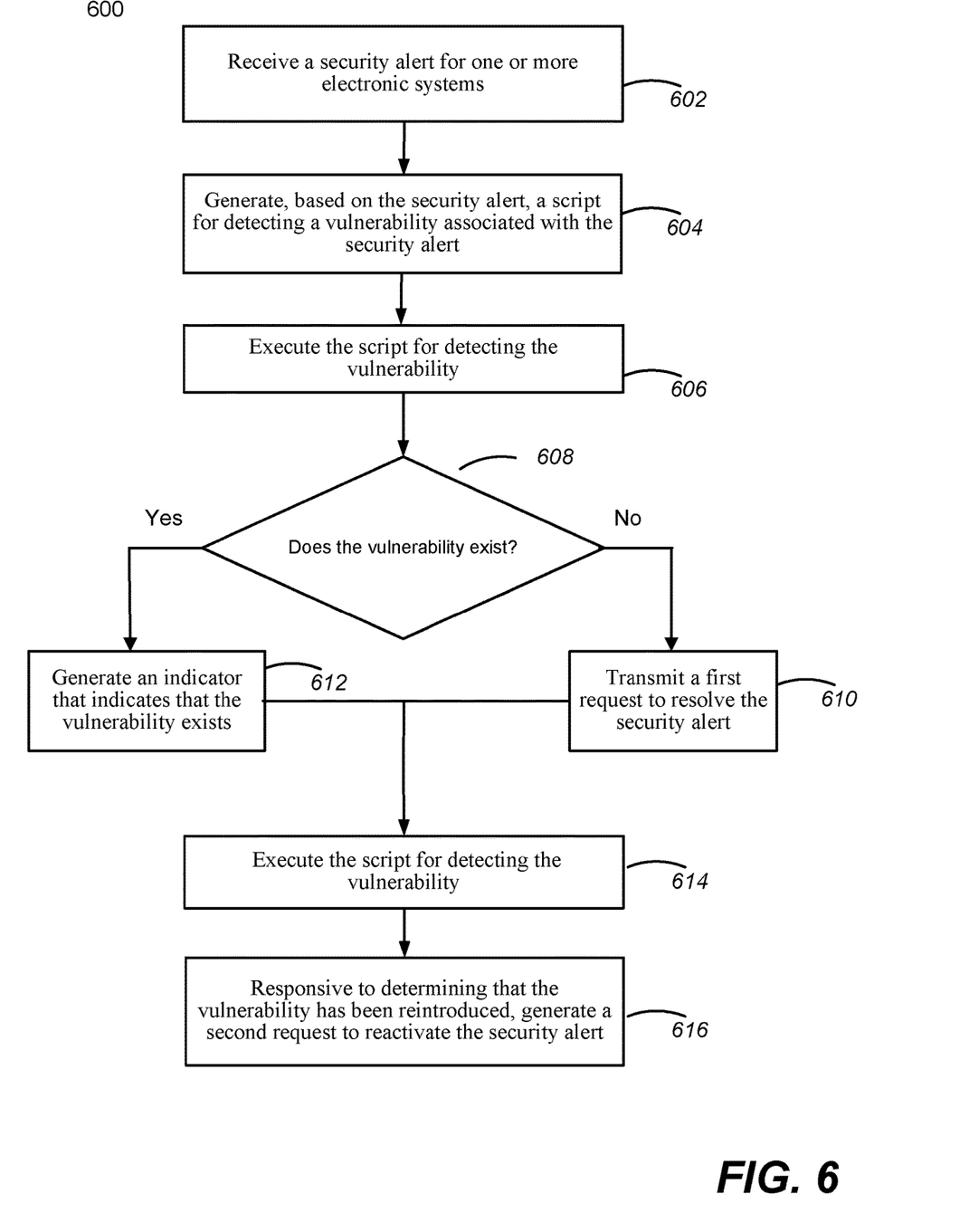
FIG. 6 illustrates one embodiment of an exemplary flow chart for automatically detecting that a previously eliminated vulnerability has reappeared, in accordance with some embodiments of this disclosure.

FIG. 6 illustrates an exemplary flow chart for automatically detecting that a previously eliminated vulnerability has reappeared. At 602, the communications module 240 receives a vulnerability alert for one or more electronic systems. The communication module 240 may receive the vulnerability alert from tracking system 110 via network 326 through network interface 320. The communication module 240 may relay the vulnerability alert to script generation module 210.

At 604, the script generation module 210 generates, based on the vulnerability alert, a script for detecting a vulnerability associated with the vulnerability alert. For example, the script generation module may use vulnerability parameters received with the vulnerability alert to generate the script. The script generation module 210 may also schedule the script to be executed during a specific time interval (e.g., every three hours). When the script has been generated the schedule may be retrieved by the script execution module 220.

At 606, the script execution module 220 executes the script for detecting the vulnerability. The script execution module 220 may access the schedule for each script generated and scheduled within the system and execute the scripts based on the schedule. The script execution module 220 may receive output from the script. As discussed above, the output may be a Boolean value indicating whether the vulnerability has been detected (Boolean value of "True") or whether the vulnerability has not been detection (Boolean value of "False").

At 608, the script execution module 220 determines (e.g., based on the output of the script) whether the vulnerability exists. If the execution module determines that the vulnerability exists, process 600 moves to 612, where the script execution module 220 generates an indicator that indicates that the vulnerability exists. Based on the determination that the vulnerability exists, the script execution module 220 may transmit a command to the communication module 240 to transmit a message (e.g., to the tracking system) that the vulnerability still exists. In some embodiments, the communication module 240 may transmit a message (e.g., an email message) to an administrator or an engineer indicating that the vulnerability exists.

In some embodiments, the script execution module may transmit the indication to the visualization module 230. The visualization module 230 may generate a screen that displays all or some vulnerability alerts and association data. The visualization module 230 may add the indicator to the display. In some embodiments, the visualization module 230 may add various events to the display screen. For example, the visualization module 230 may add all vulnerability alert activations, deactivations, and reactivations to the display screen including a corresponding time of each event.

If the script execution module 220 determines that the vulnerability does not exist, the script execution module may generate a request (e.g., to tracking system 110) to deactivate the alert. The script execution module 220 may relay the request to the communication module 240 for request transmission. Communicating module 240 may transmit the request to the tracking system 110.

After action 610 or action 612, process 600 moves to 614, where the execution module executes the script for detecting the vulnerability (e.g., after a time interval has passed). At 616, the script execution module 220, responsive to determining that the vulnerability has been reintroduced (e.g., based on further output of the script), generates a second request to reactivate the vulnerability alert. The script execution module 220 may relay the second request to the communication module 240. The communication module 240 may transmit the second request to the tracking system 110.

Additional Configuration Considerations

Some advantages of the described approach include ability to quickly identify and track security breaches and display tracking results to enable a user to react to the breach. That is, received network data is mapped, aggregated, and transformed into tracking data that can be queries using a search engine for quick tracking results.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for tracking malicious activity through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for automatically detecting vulnerabilities, the method comprising:
    obtaining an identifier associated with a vulnerability and one or more vulnerability detection parameters associated with the vulnerability;
    generating a script based in part on the one or more vulnerability detection parameters;
    storing the identifier associated with the vulnerability, the one or more vulnerability detection parameters, and the script relationally in a data structure;
    retrieving the script from the data structure based on the identifier associated with the vulnerability;
    periodically executing the retrieved script to determine whether the vulnerability has been remediated or reintroduced;
    responsive to determining that the vulnerability has been remediated, transmitting, to a vulnerability tracking system, a first request to resolve a security alert, wherein the first request includes the identifier of vulnerability; and
    responsive to determining that the vulnerability has been reintroduced, transmitting, to the vulnerability tracking system, a second request to reactivate the security alert, wherein the second request includes the identifier of the vulnerability.

2. The computer-implemented method of claim 1, wherein one of the one or more vulnerability detection parameters includes a script type or script code associated with the script.

3. The computer-implemented method of claim 2, wherein obtaining the script comprises:
    accessing a script database to retrieve a script template based on the script type.

4. The computer-implemented method of claim 3, wherein obtaining the script comprises:
    adding the script code into the script template to generate the script.

5. The computer-implemented method of claim 1, wherein obtaining the one or more vulnerability detection parameters comprises obtaining a data structure associated with the identifier, the data structure storing one or more fields for the one or more vulnerability detection parameters.

6. The computer-implemented method of claim 1, further comprising:
    determining a severity level associated with the vulnerability; and
    generating a schedule for execution of the script based on the severity level.

7. The computer-implemented method of claim 1, the method further comprising receiving a vulnerability alert associated with the identifier from the vulnerability tracking system.

8. A non-transitory computer-readable medium comprising memory with instructions encoded thereon for automatically detecting vulnerability remediations and regressions, the instructions causing one or more processors to perform operations when executed, the instructions comprising instructions to:
    obtain an identifier associated with a vulnerability and one or more vulnerability detection parameters associated with the vulnerability;
    generate a script based in part on the one or more vulnerability detection parameters;
    store the identifier associated with the vulnerability, the one or more vulnerability detection parameters, and the script relationally in a data structure;
    retrieve the script from the data structure based on the identifier associated with the vulnerability;
    periodically execute the retrieved script to determine whether the vulnerability has been remediated or reintroduced;
    responsive to determining that the vulnerability has been remediated, transmit, to a vulnerability tracking system, a first request to resolve a security alert, wherein the first request includes the identifier of vulnerability; and
    responsive to determining that the vulnerability has been reintroduced, transmit, to the vulnerability tracking system, a second request to reactivate the security alert, wherein the second request includes the identifier of the vulnerability.

9. The non-transitory computer readable medium of claim 8, wherein one of the one or more vulnerability detection parameters includes a script type or script code associated with the script.

10. The non-transitory computer readable medium of claim 9, wherein obtaining the script comprises:
    accessing a script database to retrieve a script template based on the script type.

11. The non-transitory computer readable medium of claim 10, wherein obtaining the script comprises:
adding the script code into the script template to generate the script.

12. The non-transitory computer readable medium of claim 8, wherein obtaining the one or more vulnerability detection parameters comprises obtaining a data structure associated with the identifier, the data structure storing one or more fields for the one or more vulnerability detection parameters.

13. The non-transitory computer readable medium of claim 8, wherein the instructions further comprise instructions to:
determine a severity level associated with the vulnerability; and
generate a schedule for execution of the script for detecting the vulnerability based on the severity level.

14. The non-transitory computer readable medium of claim 8, the instructions further comprising instructions to receive a vulnerability alert associated with the identifier from the vulnerability tracking system.

15. A system for automatically detecting vulnerability remediations and regressions, the system comprising:
memory with instructions encoded thereon; and
one or more processors that, when executing the instructions, are caused to perform operations comprising:
obtaining an identifier associated with a vulnerability and one or more vulnerability detection parameters associated with the vulnerability;
generate a script based in part on the one or more vulnerability detection parameters;
storing the identifier associated with the vulnerability, the one or more vulnerability detection parameters, and the script relationally in a data structure;
retrieving the script from the data structure based on the identifier associated with the vulnerability;
periodically executing the retrieved script to determine whether the vulnerability has been remediated or reintroduced;
responsive to determining that the vulnerability has been remediated, transmitting, to a vulnerability tracking system, a first request to resolve a security alert, wherein the first request includes the identifier of vulnerability; and
responsive to determining that the vulnerability has been reintroduced, transmitting, to the vulnerability tracking system, a second request to reactivate the security alert, wherein the second request includes the identifier of the vulnerability.

16. The system of claim 15, wherein one of the one or more vulnerability detection parameters includes a script type or script code associated with the script.

17. The system of claim 16, wherein obtaining the script comprises:
accessing a script database to retrieve a script template based on the script type.

18. The system of claim 17, wherein obtaining the script comprises:
adding the script code into the script template to generate the script.

19. The system of claim 15, wherein obtaining the one or more vulnerability detection parameters comprises obtaining a data structure associated with the identifier, the data structure storing one or more fields for the one or more vulnerability detection parameters.

20. The system of claim 15, where operations further comprise operations to:
determine a severity level associated with the vulnerability; and
generate a schedule for execution of the script for detecting the vulnerability based on the severity level.

* * * * *